(12) United States Patent
Hitchings et al.

(10) Patent No.: US 6,224,818 B1
(45) Date of Patent: May 1, 2001

(54) SYSTEM AND METHOD FOR PURIFYING MOLTEN METAL

(75) Inventors: Jay R. Hitchings, Downingtown, PA (US); Edward J. Kowalczyk, Wilmington, DE (US)

(73) Assignee: Ametek, Inc., Paoli, PA (US)

( * ) Notice: Subject to any disclaimer, the term of this patent is extended or adjusted under 35 U.S.C. 154(b) by 0 days.

(21) Appl. No.: 09/410,261

(22) Filed: Sep. 30, 1999

(51) Int. Cl.$^7$ ..................................................... C21B 7/12
(52) U.S. Cl. ............................ 266/45; 266/230; 266/236
(58) Field of Search .................................... 266/227, 229, 266/230, 45, 236

(56) References Cited

U.S. PATENT DOCUMENTS

| | | | |
|---|---|---|---|
| 2,252,760 | * | 8/1941 | Duclos .................................. 266/230 |
| 3,779,389 | * | 12/1973 | Fant ...................................... 266/227 |
| 4,056,586 | | 11/1977 | Pryor et al. . |
| 4,401,295 | | 8/1983 | Yoshida . |
| 4,613,350 | * | 9/1986 | Forester et al. ............................ 65/2 |
| 4,640,497 | | 2/1987 | Heamon . |
| 4,769,158 | | 9/1988 | Eckert . |
| 4,837,385 | | 6/1989 | Conti et al. . |
| 4,909,836 | | 3/1990 | El-Kaddah . |
| 4,940,489 | | 7/1990 | Cummings . |
| 5,045,111 | | 9/1991 | Sane et al. . |
| 5,114,472 | | 5/1992 | Eckert et al. . |
| 5,369,063 | | 11/1994 | Gee et al. . |
| 5,511,766 | | 4/1996 | Vassilicos . |
| 5,556,592 | | 9/1996 | Hitchings . |
| 5,676,731 | | 10/1997 | Hitchings . |

* cited by examiner

Primary Examiner—Scott Kastler
(74) Attorney, Agent, or Firm—Ratner & Prestia

(57) ABSTRACT

A process and system for purifying molten metal utilize a filter holder which has a spring-loaded clasp for releasably engaging a filter component. The filter holder is particularly well-suited to engaging and releasing a fabric filter having a frame surrounding its perimeter. The process involves releasing the filter component from the filter holder by inserting the filter component into a tapered recess of a mold composite. Another mold composite is mated over the filter component and forms a molten metal flow path, across which the filter is disposed. Then, a feed stream of molten metal is introduced to the flow path and through the filter. An advantage of the filter holder is that the spring tension within the filter holder can be adjusted to allow secure travel before insertion into the tapered recess and easy release of the filter component after insertion is complete.

30 Claims, 6 Drawing Sheets

SYSTEM AND METHOD FOR PURIFYING MOLTEN METAL

FIELD OF INVENTION

The present invention relates to the filtration of ferrous and nonferrous molten metal. More particularly, the invention relates to a system and method for purifying molten metal using a filter holder, especially adapted for engaging and releasing a fabric filter surrounded by a supporting frame.

BACKGROUND OF THE INVENTION

Molten metal filtration is the process used to obtain high quality metals suitable for casting. By removing undesirable impurities from the molten metal, the filtration process improves the products of the casting operation. Both mechanical and physical properties of casting products are enhanced by filtration.

In general, molten metal raw feed contains undesired impurities from sources such as particles of refractory from the lining of a vessel that contains the molten metal, alumina as a byproduct of deoxidization and reoxidation, fragments of slag or other insoluble impurities. Upon solidification of the cast product, these impurities adversely affect product properties such as surface finish, ease of drawing and forming, ease of welding, and strength. Therefore, a primary objective of the foundry industry is to remove impurities from molten metal raw feed by filtration. Filtration of the molten metal occurs prior to the casting operation and after the melting operation.

The melting operation involves melting metal so that it may be used in the casting operation. The metal is melted in a furnace wherein the constituent components are added in the form of unmelted scrap and/or refined virgin metal, deoxidizing agents in various forms (solid and gaseous or a combination of both) and alloying elements. Gases and low density solids tend to migrate to the surface of the melt where they either effervesce or float in combination with partially and completely solidified oxides commonly known as slag and dross. The higher density impurities in the melt tend to remain in the liquid phase of the metal, or melt, as the fluid flow convection currents are generated within that melt by the heat applied by the furnace.

During the melting operation, the furnace functions as a holding vessel for the metal while it is being melted. The furnace may also be used to refine the metal depending on what type of metal is being processed. Metal is refined when gases as well as low density metals migrate to the surface. The molten metal is transferred to another vessel, such as a ladle, to be transported to the molding operation. An alternative method would be to provide a direct flow path from the furnace to the casting operation. In both instances, prior to the casting/molding operations, the molten metal is routinely filtered.

The filtering system requires an efficient process to prevent solidification of the metal. Moreover, the filter medium must be suitable to withstand high melting temperatures and chemical reactions. Furthermore, the filter component must maintain its structural integrity. Lastly, the filter medium must be capable of either entrapping or preventing the flow of impure solids, liquids, and semi-liquids, all of which are non-metallic or intermetallic, either by chemically reacting with such impurities and/or by mechanically preventing the flow of such impurities through the filter medium, while still permitting and facilitating the flow of the molten metal through the filter.

Ceramic foam filters are commonly used in filtration operations by foundries. Ceramic filters reduce the number of castings that must be scrapped due to the presence of impurities and therefore improve casting cleanliness. Generally, ceramic filters are incorporated into the casting operation upstream of the mold cavity. The ceramic filters remove dross, slag and other impurities found in molten metal prior to the casting operation. The most common type of ceramic filters comprise hard-fired cellular ceramic structures and rigid reticulated ceramic foam. The ceramic filters, due to their mass, often chill the first molten metal that reaches the filter. Therefore, they require coarse openings to ensure reliable passage of the molten metal. Cellular extruded ceramic filters therefore rely on the formation of a filter cake on the upstream side to remove smaller inclusions that would tend to pass through the openings of the filter. Thus, ceramic foam filters are dependent on the formation of the filter cake to remove smaller inclusions. Due to the massive size and filtering problems that are inherent with the ceramic filters, fabric filters present a new opportunity for the casting operation.

At the present time, there is no commercially available filtration system which allows a continual replacement of a filter component which utilizes a fabric filter medium. A filter component having a fabric filter medium that is compact and effective during filtration would be desirable. It would be even more desirable to utilize such a filter in an automated, continuous filtration system.

SUMMARY OF THE INVENTION

In view of its purposes, the present invention provides a process for purifying molten metal comprising first engaging a filter component with a filter holder, wherein the filter holder has a spring-loaded clasp for releasably engaging the filter component. Then, the filter component is released from the filter holder by inserting the filter component into a tapered recess of a first mold composite. A second mold composite is mated with the filter component and with the first mold composite, to form a molten metal flow path, across which the filter component is disposed. A feed stream of the molten metal is introduced to an inlet conduit forming a down sprue in fluid flow communication with the molten metal flow path, such that the molten metal flows through the filter component.

The present invention also provides a system for purifying molten metal comprising a first mold composite having a tapered recess, a filter component, and a filter holder comprising a spring-loaded clasp for engaging the filter component and releasing the filter component into the tapered recess. The system also includes a second mold composite mated with the first mold composite to form a molten metal flow path across which the filter component is disposed and an inlet conduit forming a down sprue in fluid flow communication with the molten metal flow path for introducing molten metal into the molten metal flow path.

Another aspect of the present invention is an apparatus for use with a molten metal filtration system comprising a filter component comprising a fabric medium for filtering molten metal and a frame for supporting the fabric medium, and a filter holder having a spring-loaded clasp for releasably engaging the frame.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawings.

DETAILED DESCRIPTION OF THE INVENTION

Figure 1:
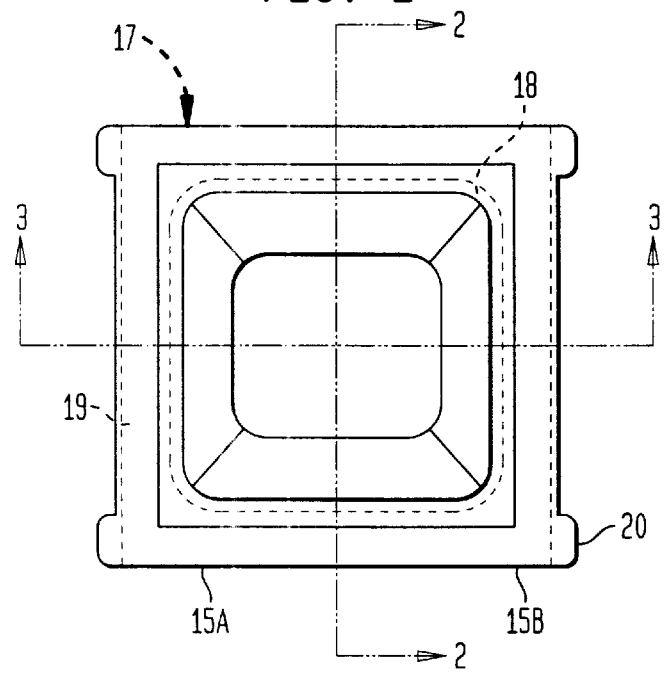
FIG. 1 is a top plan view of the first and second mold composites mated together. The filter component, which is positioned between the mold composites, is shown in hidden view (i.e., dashed lines).

Referring to the drawings in detail, wherein like reference numerals represent like elements throughout the several figures, FIG. 1 shows a top plan view of an imprint defined by a first mold composite 15A and a second mold composite 15B. The imprint is formed by individually compressing each mold composite against a patterned print whose shape corresponds to that of the desired imprint. Mold composites are typically sand and a resin, and patterned prints can be any metal or plastic, although metals are preferred due to their relative hardness compared with plastics. Upon mating in a known way, the first mold composite 15A and second mold composite 15B define a molten metal flow path. The dashed lines within the mold cavity represent a filter component 17. The filter component 17 comprises a filter medium 18 and a filter frame 19. The inner most dashed line represents the outer periphery of filter medium 18 while the outer periphery of filter frame 19 is displayed by the outermost dashed line. Sand traps 20 are further indentations in the mold composites extending outward from line 2—2 and are formed by protrusions in the patterned print. Sand traps 20 are used to trap sand that is displaced during the molten metal filtration process, in a known way.

Figure 2:
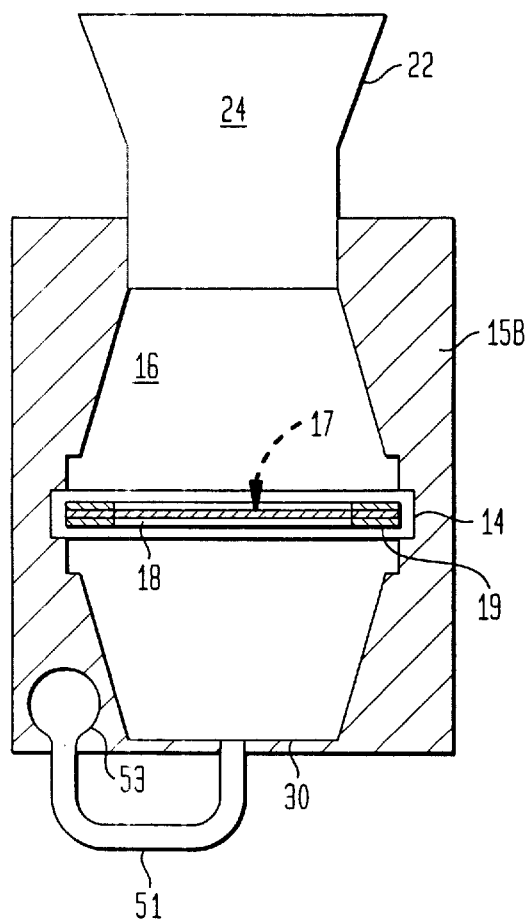
FIG. 2 is a sectional view of the second mold composites taken along is line 2—2 of FIG. 1

FIG. 2 shows a sectional view of second mold composite 15B along line 2—2. The sectional view of filter component 17 comprising filter medium 18 and filter frame 19 is also shown. The filter component 17 is located at the center of the mold composite cavity 16, which can be formed by compressing a mold composite against a patterned print, as discussed above, and fits snugly in a tapered recess 14. An inlet conduit 22 defines a down sprue 24 and is positioned above the mold composite cavity 16 and the filter component 17. The molten metal enters the inlet conduit 22 to commence the filtration process. Thus, down sprue 24 and mold composite cavity 16 form part of the molten metal flow path. The down sprue 24 defined by inlet conduit 22 directs the molten metal into the molten metal cavity 16. After completing the passage through filter medium 18 the molten metal exits the cavity through the outlet 30. As shown in FIG. 2 only, a casting passage 51 directs purified molten metal to a casting area 53. Casting passage 51 is preferably formed in one of the mold composites. In addition, one or both of the mold composites may define one or more casting areas, although only one casting area is shown.

Figure 3:
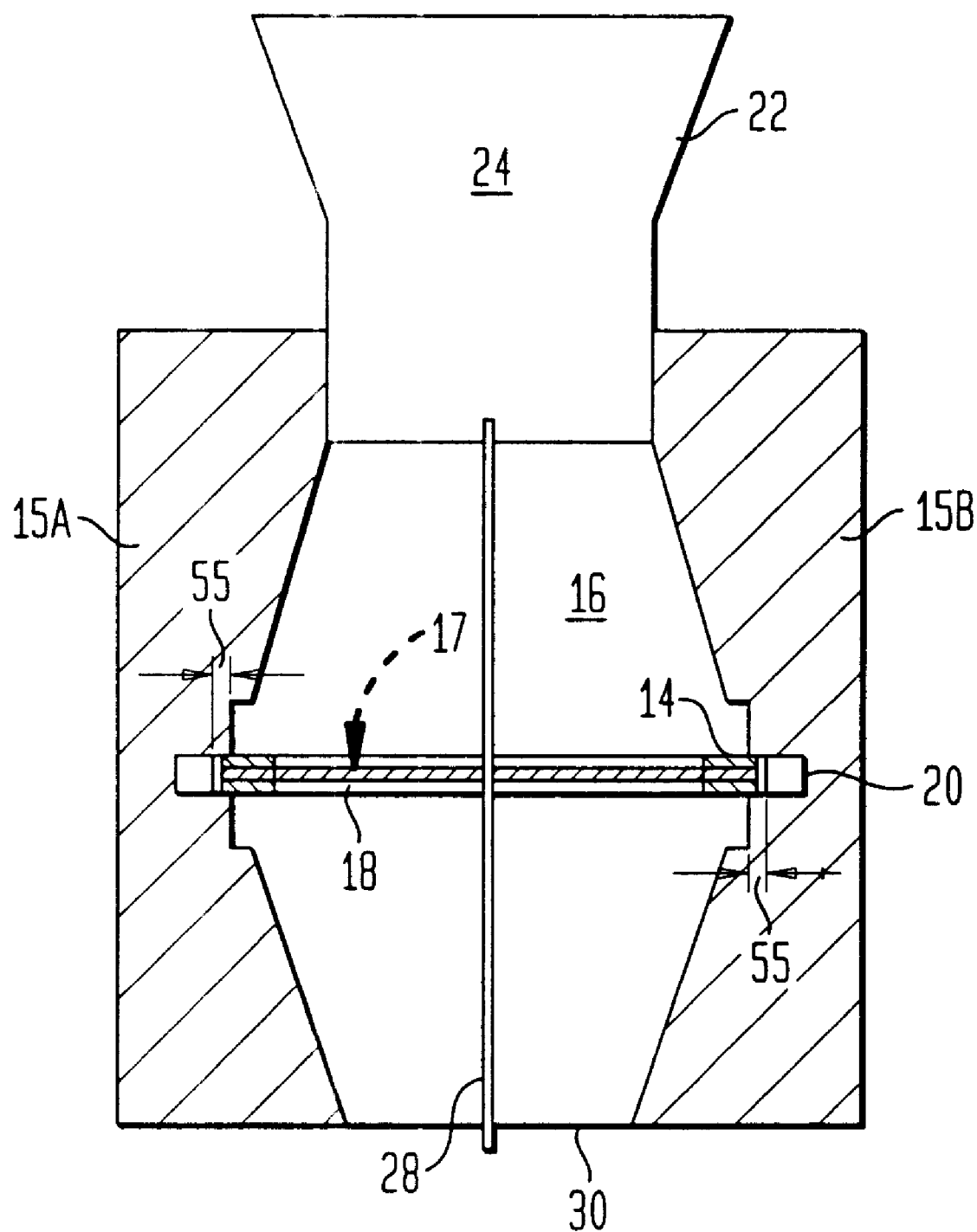
FIG. 3 is a sectional view of the assembled first and second mold composites taken along line 3—3 of FIG. 1.

FIG. 3 displays a cross sectional view of the assembled mold composites 15A and 15B and filter component 17 taken along line 3—3 of FIG. 1. The line 28 represents the mating line where the first and second mold composites are joined in a known manner. Mold composites 15A and 15B are mated with one another to provide a closed molten metal flow path in a conventional manner. In FIG. 3, sand traps 20 are shown to emerge from the ends of the tapered recess 14. The sand trap 20 contains any sand flow during the filtration process. To ensure that the integrity of the frame 19 is maintained during the filtration process, there must be a snug fit at the intersection of the top and bottom of frame 19 with mold composites 15A and 15B. This close tolerance can be achieved by closely matching the height of frame 19 with the height of the patterned print at a region corresponding to intersection region 55, where the mold will intersect the frame. Preferably, for reasons discussed below, the it height of the patterned print at these regions is slightly less than (e.g., on the order a few thousandths of an inch less than) the height of frame 19. For example, in one embodiment, the height of the patterned print in regions corresponding to intersection region 55 is about 140 thousandths of an inch and the height of frame 19 is about 155 thousandths of an inch. As shown again in FIG. 3, the inlet conduit 22 forms down sprue 24 disposed above the mold composite cavity 16.

Figure 4:
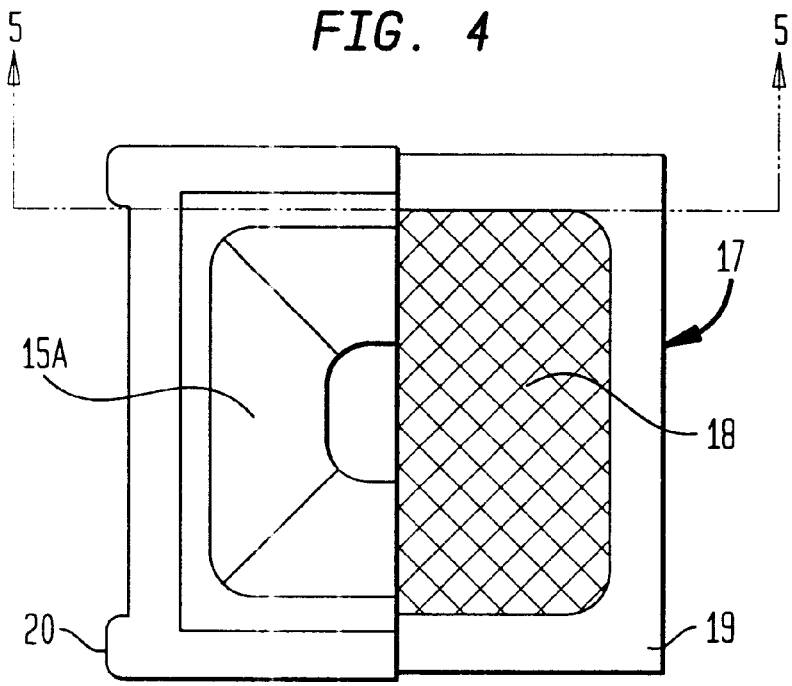
FIG. 4 is a top plan view of the first mold composite with the filter component inserted therein.

A top plan view of the imprint formed in the first mold composite 15A with the filter component 17 engaged therein is shown in FIG. 4. The filter component 17 comprising the filter medium 18 and filter frame 19 is securely inserted into the tapered recess of the first mold composite 15A. The filter medium 18 is preferably a fabric filter composed of refractory filaments or yarn comprising alumina, fiberglass, silica or a combination thereof. One such fabric filter is sold under the trademark SILTEMP® by AMETEK, Inc. of Paoli, Pa. The filter medium 18 is firmly supported by a frame 19 around its periphery. The frame is preferably composed of commercially available chipboard, cardboard or a mixture thereof. The filter medium 18 can be attached to frame 19 by any conventional means, such as gluing.

Figure 5:
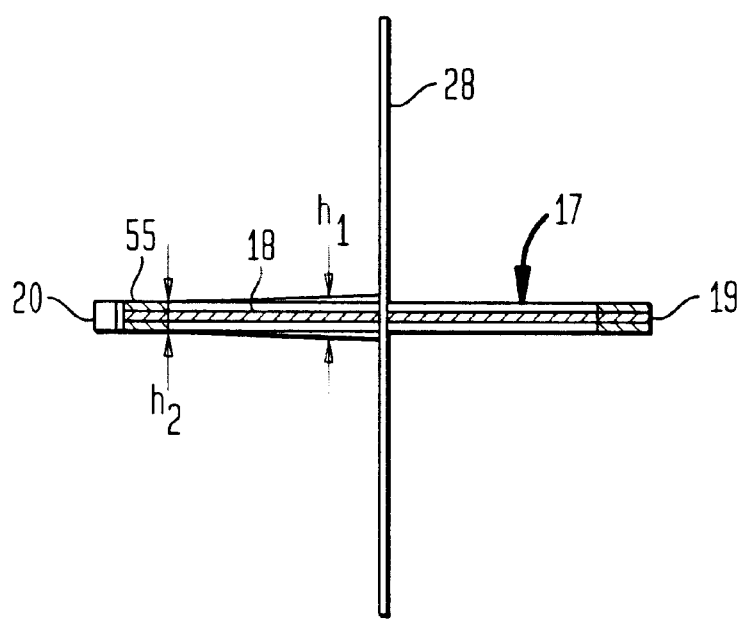
FIG. 5 is a sectional view showing the tapered recess of the first mold composite taken along line 5—5 of FIG. 4.

A sectional view of the tapered recess formed in first mold composite 15A and the filter component 17 taken along line 5—5 of FIG. 4 is represented in FIG. 5. Line 28 depicts the location in which the second mold composite 15B will be mated with the first mold composite 15A. The filter component 17 is inserted within the tapered recess 14 of the first mold composite. As shown most clearly by FIG. 5, the tapering of tapered recess 14 refers to its change in height from height $h_1$ near line 28 to height $h_2$ near region 55. Preferably, the change in height is slight, for example about 30 to 90 thousandths of an inch (and in one exemplary embodiment 60 thousandths), and the angle of tapering is also slight. The height $h_2$ need only be sufficient to allow an easy insertion of the filter component 17. Sand trap 20 is a further indentation in the mold composite. In a preferred embodiment as discussed above, the thickness of the frame 19 is slightly greater than height $h_2$ of the tapered recess 14 of mold composites 15A and 15B. This allows the filter component 17 to maintain a secure fit with the mold components upon insertion and during the filtration process.

Figure 6:
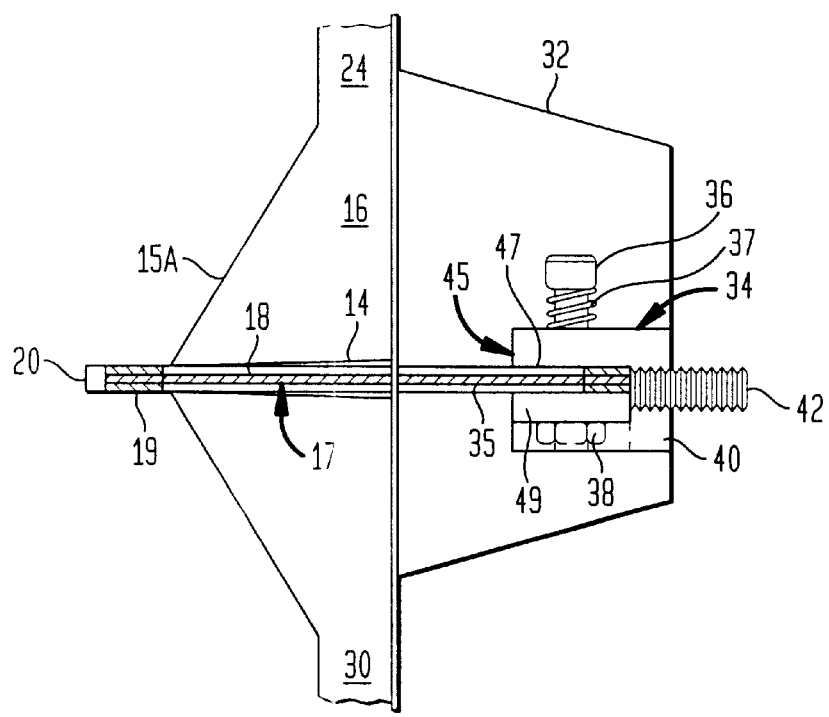
FIG. 6 is a partial sectional view of the first composite and the filter holder, which engages the filter component.

FIG. 6 depicts a partial sectional view of the first mold composite 15A as the filter holder 34 is inserting filter component 17 into tapered recess 14. The filter holder 34 is located within a recessed area of a core mask 32. The core mask 32 is part of a conventional mold making machine (not shown), such as a DISAMATIC™ mold making machine commercially available from Georg Fischer Disa of Switzerland. The mounting plate 40 of the filter holder 34 is mounted onto the core mask 32 by at least one mounting screw 42. In a preferred embodiment, the filter holder 34 is composed of aluminum, although any metal or hard plastic is suitable. The filter component 17 is positioned between a top plate 47 and a bottom plate 49 of the filter holder 34 (also shown in FIG. 7), which forms a spring loaded clasp 45 for engaging the filter component 17 and for releasing the filter component 17 into the tapered recess 14. Spring-loaded clasp 45 comprises the top plate 47, the bottom plate 49, screws 36, and a spring 37. Although only one screw 36 is apparent in this sectional view, more than one screw can be used.

Figure 7:
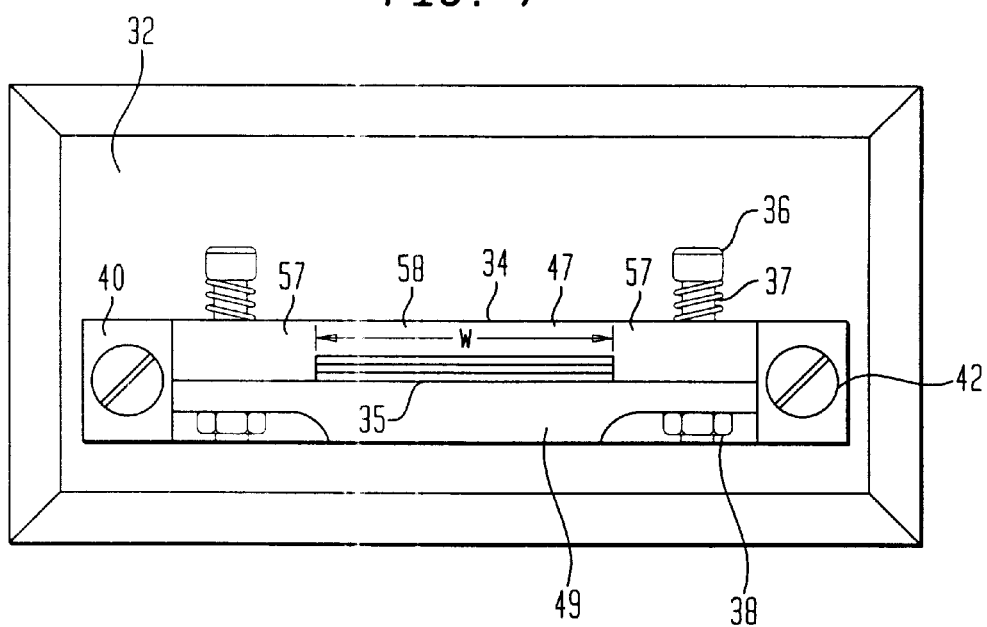
FIG. 7 is a front plan view of the filter holder, shown in FIG. 6 and rotated 90°, mounted onto the core mask.

As shown in FIGS. 6 and 7, top plate 47 has a first portion 57 adapted to contact bottom plate 49 and a second portion 58 defining, with the bottom plate, a clasp recess 35 adapted to receive the filter component 17. The delineation between first portion 57 and second portion 58 define the width w of the clasp recess 35. Preferably, width w is essentially equivalent to the width of the frame. Screw 36, which has a head with a bearing surface, extends through top plate 47 and bottom plate 49 and engages a nut 38 abutting against bottom plate 49. One or more washers (not shown) may be used in conjunction with this arrangement. A spring 37 extends between the bearing surface of the head of the screw 36 and top plate 47 to exert a force on the top plate towards bottom plate 49. In a known manner, the force can be adjusted by adjusting screw 36.

FIG. 7 depicts a front plan view of the filter holder 34 and the core mask 32. The mounting plate 40 of the filter holder 34 is securely mounted onto the core mask by the mounting plate screws 42. Although two mounting plate screws 42 are shown in this diagram, one screw or more than two screws are also acceptable. The top plate 47 and bottom plate 49 are joined with two spring loaded screws 36 and adjoining nuts 38, as discussed above. According to the invention, the filter component 17 is placed in the clasp recess 35 between the top 47 and bottom 49 plates.

Figure 8:
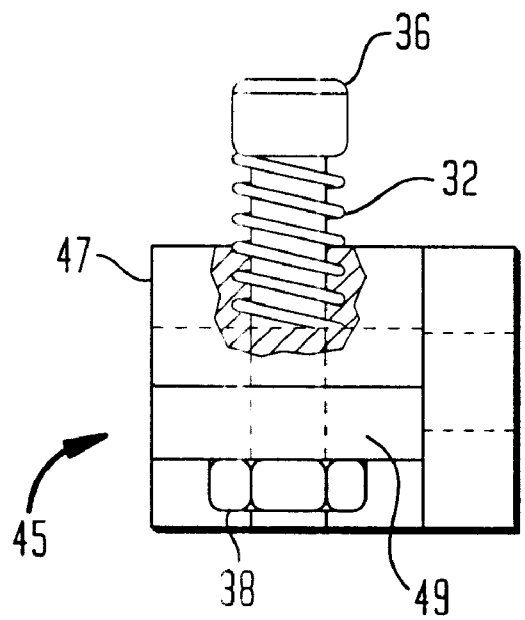
FIG. 8 is a sectional view of the filter holder and the spring-loaded clasp.

The spring loaded screw 36 coupled with the nut 38 join the top plate 47 and bottom plate 49 are also shown in FIG. 8. This configuration forms the clasp 45 of the filter holder 34 apparatus. As shown in FIG. 8, spring 37 extends between and bears against the bearing surface of the head of the screw 36 and a bearing surface of top plate 47 formed below the top surface of top plate 47. Alternatively, the spring may bear against the bearing surface of the head of the screw 36 and the top surface of top plate 47 (as shown in FIG. 6). The relative diameter of the screw 36 and the diameter of the opening through which the screw extends are dictated by the particular needs of the application. To avoid lateral movement of the filter component 17, the difference in size between the diameter of the screw 36 and the diameter of the opening can be designed to below, such as about $\frac{1}{32}^{nd}$ or $\frac{1}{64}^{th}$ of an inch.

Figure 9:
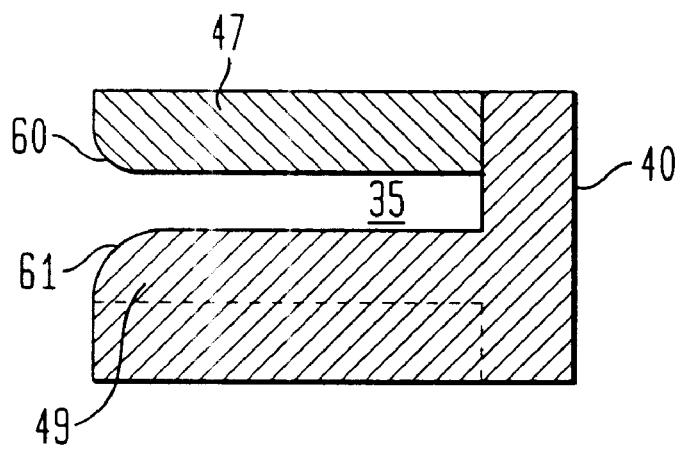
FIG. 9 is a sectional view of the clasp of the filter holder.

The clasp is more apparent in the cross sectional view of FIG. 9. The clasp 45 defines clasp recess 35 between the top plate 47 and bottom plate 49. FIG. 9 clearly depicts the chamfered edges 60 and 61 of the top plate 47 and bottom plate 49 of the filter holder 34. In a preferred embodiment, the edges 60 and 61, which are adjacent clasp recess 35, of both top plate 47 and bottom plate 49 are chamfered as shown. However, the system would also function with at least one edge chamfered or with no chamfered edge. Chamfered edges facilitate the placement of the filter component into the clasp recess. The mounting plate 40 is used to mount the filter holder 34 onto the core mask 32.

Figure 10:
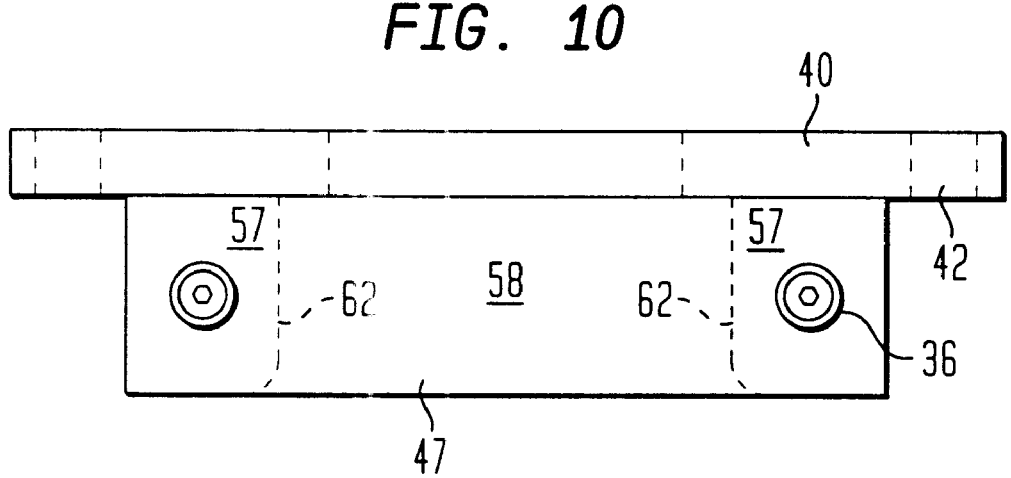
FIG. 10 is a top plan view of the top plate of the filter holder.

FIG. 10 represents a top view of the filter holder 34. In the preferred embodiment, mounting plate 40 is positioned against a core mask 32. The openings for the mounting plate screws 42 are used to mount the mounting plate 40. Two spring loaded screws 36 entering through the top plate 47 and exiting the bottom plate 49 are used, as discussed above. However, one spring loaded screw 36 can also be used to form the clasp 45 of the filter holder 34. The dashed lines within the top plate 47 depict delineation between first portions 57 and second portion 58 of top plate 47, which define, along with bottom plate 49, the clasp recess 35. As shown, these dashed lines are curved at their edges to form chamfered edges 62 around the screws 36. Chamfered edges 62, which extend perpendicular to the width w of clasp recess 35, serve the same function as chamfered edges 60 and 61, which extend along the width w of the clasp recess.

Figure 11:
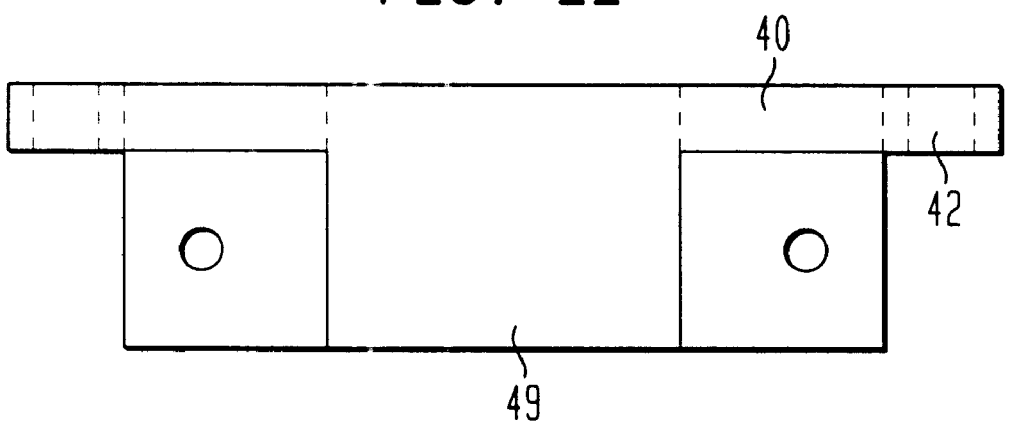
FIG. 11 is a bottom plan view of the base plate of the filter holder.

FIG. 11 shows the mounting plate 40 and bottom plate 49 integrally formed therewith. A linear configuration forming openings for tightening and loosening nuts 38 is shown, although other configurations (or no configuration) need be present.

This process for purifying molten metal using a filter holder of the present invention is accomplished in a series of steps. First, the filter component 17 is engaged with the filter holder 34, typically by being manually inserted into the clasp recess 35. Upon formation of the first mold composite 15A, the filter holder 34 inserts the filter component 17 into the tapered recess 14 of the first mold composite 15A, such as by causing core mask 32 to move into place, as is automatically accomplished in automatic mold making machines. As mentioned above, the thickness of the filter component 17 is greater than height $h_2$ of the tapered recess 14 of the first mold composite 15A. This arrangement causes a frictional engagement between first mold composite 15A and the frame 19. The frictional engagement between the first mold composite 15A and the filter component 17 exert a force far greater than the spring force of the clasp 45 and any frictional force between clasp 45 and the frame 19. This results in the release of the filter component 17 by the clasp 45. Subsequently, core mask 32 and thus the filter holder 34 retract from the first mold composite 15A and the second mold composite mates with the first mold composite defining the molten metal flow path. Mating the two mold composites includes first aligning the tapered recess of second mold composite 15B with the filter component, in a known manner. The filter holder 34 is then manually (or automatically) fed again with a new filter component to continue the process.

The filter medium 18 within the filter component 17 is available in a variety of dimensions and mesh sizes. The dimensions of the filter component 17 are dictated by the mold making machine with which the component is used and the mesh sizes are a function of the impurities present in the metal, the type of metal, and other system parameters, such as flow rate. The selection of the suitable mesh size is well known to those skilled in the art. Also, the dimensions of the filter holder 34 can altered to accommodate the different sizes of the filter component 17 by adjusting at least one of the top plate 47 or bottom plate 49. The dimensions and mesh size of the fabric filter medium 18 can be adjusted to achieve the desired flow rates for both ferrous and nonferrous metals (e.g., white iron, gray iron, malleable iron, compacted graphite iron, ductile iron, carbon steel, stainless steel, brass, bronze, aluminum). In one embodiment, white iron is filtered using a fabric filter medium 18 with dimensions of 2×2 inches at a flow rate of 4.20 lbs./sec. in a DISAMATIC mold making machine. The mesh size of the fabric filter medium is 1.0 mm×1.0 mm.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A process for purifying molten metal comprising the steps of:
   (a) engaging a filter component with a filter holder, wherein said filter holder has a spring-loaded clasp for releasably engaging said filter component;
   (b) releasing said filter component from said filter holder by inserting said filter component into a tapered recess of a first mold composite;
   (c) mating a second mold composite with the filter component and with said first mold composite, wherein said first mold composite and said second mold composite form, upon mating, a molten metal flow path, across which said filter component is disposed; and
   (d) introducing a feed stream of said molten metal to an inlet conduit forming a down sprue in fluid flow communication is with said molten metal flow path, wherein said molten metal flows through said filter component.

2. A process according to claim 1, wherein at least one of said first mold composite or said second mold composite defines a casting area downstream of said filter component in which a metal product is cast and to which the molten metal flow is directed.

3. A process according to claim 1, wherein said filter component comprises a fabric medium for filtering molten metal and a frame for supporting said fabric medium.

4. A process according to claim 3, wherein said fabric medium comprises silica and a resin and said frame comprises cardboard, wherein said clasp engages said frame.

5. A process according to claim 4, wherein said spring-loaded clasp comprises:
   (a) a bottom plate;
   (b) a top plate having a first portion adapted to contact said bottom plate and a second portion defining, with said bottom plate, a clasp recess adapted to receive said filter component;
   (c) at least one screw, having a head, extending through said top plate and said bottom plate and engaging a nut abutting said bottom plate; and
   (d) at least one spring extending between a bearing surface of said head and said top plate to exert a force on said top plate towards said bottom plate, wherein said force can be adjusted by adjusting said screw.

6. A process according to claim 5, wherein said clasp recess has:
   (a) a height which, when said first portion is in contact with said bottom plate, is slightly less than the height of the frame, whereby the step of engaging said filter component with said filter holder causes said first portion to separate from said bottom plate against the spring force; and
   (b) a width essentially equivalent to the width of said frame.

7. A process according to claim 5, wherein said top plate and said bottom plate have chamfered edges adjacent said clasp recess.

8. A process according to claim 1, wherein the step of releasing said filter component from said filter holder comprises inserting said filter component to cause a frictional engagement between said filter component and said first mold composite, wherein said frictional engagement exerts a force on said filter component greater than the spring force of said clasp.

9. A process according to claim 1, wherein said filter holder comprises a mounting plate coupled to said clasp and mounted to a core mask, and the step of releasing said filter component from said filter holder comprises moving said core mask to cause said filter component to be inserted into said tapered recess.

10. A process according to claim 1, wherein the step of mating said second mold composite with said filter component includes first forming a second tapered recess in said second mold composite and aligning said second tapered recess with said filter component.

11. A system for purifying molten metal comprising:
    (a) a first mold composite having a tapered recess;
    (b) a filter component;
    (c) a filter holder comprising a spring-loaded clasp for engaging said filter component and releasing said filter component into said tapered recess;
    (d) a second mold composite mated with said first mold composite to form a molten metal flow path across which said filter component is disposed; and
    (e) an inlet conduit forming a down sprue in fluid flow communication with said molten metal flow path for introducing molten metal into the molten metal flow path.

12. A system according to claim 11, wherein said first mold composite and said second mold composite comprise sand and a resin.

13. A system according to claim 11, wherein said filter component comprises a fabric medium for filtering molten metal and a frame for supporting said fabric medium.

14. A system according to claim 11, wherein said fabric medium comprises silica and a resin and said frame comprises cardboard, wherein said clasp engages said frame.

15. A system according to claim 14, wherein said spring-loaded clasp comprises:
    (a) a bottom plate;
    (b) a top plate having a first portion adapted to contact said bottom plate and a second portion defining, with said bottom plate, a clasp recess adapted to receive said filter component;
    (c) at least one screw, having a head, extending through said top plate and said bottom plate and engaging a nut abutting said bottom plate; and
    (d) at least one spring extending between a bearing surface of said head and said top plate to exert a force on said top plate towards said bottom plate, wherein said force can be adjusted by adjusting said screw.

16. A system according to claim 15, wherein said clasp recess has:
    (a) a height which, when said first portion is in contact with said bottom plate, is slightly less than the height of the frame, whereby when said filter component is engaged by said filter holder, said first portion separates from said bottom plate against the spring force; and
    (b) a width essentially equivalent to the width of said frame.

17. A system according to claim 15, wherein at least one of said top plate and said bottom plate have chamfered edges adjacent said clasp recess.

18. A system according to claim 11, wherein said tapered recess is configured to cause a frictional engagement between said filter component and said first mold composite, wherein said frictional engagement exerts a force on said filter component greater than the spring force of said clasp.

19. A system according to claim 11, wherein said filter holder comprises a mounting plate coupled to said clasp and said system further comprises a core mask, wherein said mounting plate is mounted to said core mask, for moving said filter holder to insert said filter component into said tapered recess.

20. A system for purifying molten metal comprising:

means for filtering molten metal;

means for defining a molten metal flow path and for supporting said filtering means across said molten metal flow path;

means for engaging said filtering means and for inserting said filter means into said supporting means; and means for introducing molten metal to said molten metal flow path.

21. A -system for purifying molten metal according to claim 20 wherein said filtering means comprises a filter positioned perpendicular to said molten metal flow path.

22. A system for purifying molten metal according to claim 20 wherein said means for defining a molten metal flow path comprises a first mold composite and a second mold composite.

23. A system for purifying molten metal according to claim 20 wherein said means for engaging said filtering means and inserting said filtering means into said supporting means comprise a filter holder.

24. A system for purifying molten metal according to claim 20, wherein said means for introducing molten metal to said molten metal flow path comprise an inlet conduit forming a down sprue.

25. An apparatus for use with a molten metal filtration system comprising:

a filter component comprising a fabric medium for filtering molten metal and a frame for supporting said fabric medium; and a filter holder having a sping-loaded clasp for releasably engaging said frame.

26. An apparatus according to claim 25, wherein the fabric medium comprises a refractory cloth of a material selected from the group consisting of alumina, fiberglass, silica or a combination thereof.

27. An apparatus according to claim 25, wherein the frame for supporting said fabric medium comprises a material selected from the group consisting of chipboard, cardboard, or a combination thereof.

28. An apparatus according to claim 27, wherein said spring-loaded clasp comprises:

(a) a bottom plate;

(b) a top plate having a first portion adapted to contact said bottom plate and a second portion defining, with said bottom plate, a clasp recess adapted to receive said filter component;

(c) at least one screw, having a head, extending through said top plate and said bottom plate and engaging a nut abutting said bottom plate; and (d) at least one spring extending between a bearing surface of said head and said top plate to exert a force on said top plate towards said bottom plate, wherein said force can be adjusted by adjusting said screw.

29. An apparatus according to claim 28, wherein said clasp recess has:

(a) a height which, when said first portion is in contact with said bottom plate, is slightly less than the height of the frame, whereby when said filter component is engaged by said filter holder, said first portion separates from said bottom plate against the spring force; and (b) a width essentially equivalent to the width of said frame.

30. An apparatus according to claim 25, wherein at least one of said top plate and said bottom plate have chamfered edges adjacent said clasp recess.

* * * * *

UNITED STATES PATENT AND TRADEMARK OFFICE
CERTIFICATE OF CORRECTION

PATENT NO. : 6,224,818 B1
DATED : May 1, 2001
INVENTOR(S) : Jay R. Hitchings et al.

It is certified that error appears in the above-identified patent and that said Letters Patent is hereby corrected as shown below:

Column 7,
Line 27, after "communication", delete "is".

Column 9,
Line 21, change "-system" to -- system --.

Signed and Sealed this

Twenty-second Day of January, 2002

Attest:

JAMES E. ROGAN
Attesting Officer
Director of the United States Patent and Trademark Office